(12) United States Patent
Zacary, Jr. et al.

(10) Patent No.: US 10,874,967 B2
(45) Date of Patent: Dec. 29, 2020

(54) SEPARATOR ASSEMBLY FOR FILTER SYSTEMS

(71) Applicant: Air Systems Design, Inc., Mandeville, LA (US)

(72) Inventors: Robert M. Zacary, Jr., Covington, LA (US); Christopher A. Donley, Mandeville, LA (US)

(73) Assignee: Air Systems Design, Inc., Mandeville, LA (US)

( * ) Notice: Subject to any disclaimer, the term of this patent is extended or adjusted under 35 U.S.C. 154(b) by 243 days.

(21) Appl. No.: 15/838,800

(22) Filed: Dec. 12, 2017

(65) Prior Publication Data

US 2019/0176074 A1  Jun. 13, 2019

(51) Int. Cl.
*B01D 46/00* (2006.01)
*B01D 46/44* (2006.01)
*B01D 46/10* (2006.01)
*B03C 3/36* (2006.01)

(52) U.S. Cl.
CPC ....... *B01D 46/0026* (2013.01); *B01D 46/006* (2013.01); *B01D 46/0042* (2013.01); *B01D 46/103* (2013.01); *B01D 46/44* (2013.01); *B03C 3/36* (2013.01)

(58) Field of Classification Search
CPC ............... B01D 46/00; B01D 46/0026; B01D 46/0042; B01D 46/006; B01D 46/103; B01D 46/44; B01D 46/106; B03C 3/36
USPC ......... 55/282–305; 96/228–233; 95/278–282
See application file for complete search history.

(56) References Cited

U.S. PATENT DOCUMENTS

| | | | | |
|---|---|---|---|---|
| 4,443,235 A | * | 4/1984 | Brenholt | B01D 46/0075 15/326 |
| 4,540,421 A | | 9/1985 | Wilson et al. | |
| 4,681,607 A | * | 7/1987 | Bollerhey | B01D 46/02 55/284 |
| 2002/0073849 A1 | * | 6/2002 | Buettner | B01D 39/1623 95/280 |
| 2004/0261376 A1 | * | 12/2004 | Morgan | B01D 46/523 55/302 |
| 2006/0096263 A1 | * | 5/2006 | Kahlbaugh | B01D 46/2411 55/527 |
| 2014/0245920 A1 | * | 9/2014 | Govindappa | B01D 46/002 105/96 |
| 2014/0260992 A1 | * | 9/2014 | Fernaays | B01D 46/103 96/229 |

FOREIGN PATENT DOCUMENTS

| | | |
|---|---|---|
| GB | 1575175 | 9/1980 |
| GB | 2134815 | 8/1984 |

* cited by examiner

*Primary Examiner* — T. Bennett McKenzie
(74) *Attorney, Agent, or Firm* — Kilpatrick Townsend & Stockton LLP

(57) ABSTRACT

A separator assembly includes a chamber having an inlet and an outlet where a flow path is defined through the chamber from the inlet to the outlet. In some examples, the separator assembly includes a screen configured to filter solid material from a fluid flowing along the flow path. The separator assembly may include a pulse jet assembly configured to selectively clean the solid material from the screen. In various examples, the separator assembly may include a bleed-in assembly having a bleed-in port and configured to selectively direct a fluid through the bleed-in port and into the chamber.

8 Claims, 4 Drawing Sheets

SEPARATOR ASSEMBLY FOR FILTER SYSTEMS

FIELD OF THE INVENTION

This application relates to filter systems, and more particularly to separator assemblies for filter systems.

BACKGROUND

Various industries use filter systems to remove dust and/or other contaminants at a given location. For example, in the paper industry, and in particular the non-woven paper industry (making products such as tissue paper, paper towels, hygienic personal products, etc.), filter systems are used to control the amount of dust in a work area. Filter systems may pull in the contaminated air using suction hoods, filter the dust from the air, and vent the filtered air into the atmosphere or recirculate the filtered air back to the work area. Sometimes, larger, rogue material may end up in the filter systems, either through product or material getting caught and pulled in through the suction hoods, and/or by operators shoving material in the suction hoods during cleaning periods. This can result in the product or material plugging the filter system and/or mechanical failure caused by the rogue material. Rogue material in the filter system will cause downtime and the efficiency of the suction hood drops. Moreover, once the rogue material is in the system, it is difficult and time consuming to find and remove the material to return the filter system back to normal operating condition.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a separator assembly includes a chamber, a screen, a pulse jet assembly, and a bleed-in assembly. In some examples, the chamber includes an inlet and an outlet and a flow path is defined through the chamber from the inlet to the outlet. In certain cases, the screen is configured to filter solid material from a fluid flowing along the flow path. In various examples, the pulse jet assembly is configured to selectively clean the solid material from the screen. In some aspects, the bleed-in assembly includes a bleed-in port and is configured to selectively direct a bleed-in fluid through the bleed-in port and into the chamber.

According to various examples, a separator assembly includes a chamber, a screen, and a pulse jet assembly. In some examples, the chamber includes an inlet and an outlet and a flow path is defined through the chamber from the inlet to the outlet. In certain aspects, the screen is in the flow path and in a first portion the chamber between the inlet and the outlet. In various cases, the pulse jet assembly is in the flow path, in a second portion of the chamber, and downstream from the screen, and is configured to selectively direct a disrupting fluid on the screen.

According to some examples, a separator assembly includes a chamber, a screen, and a bleed-in assembly. In various aspects, the chamber includes an inlet and an outlet and a flow path is defined through the chamber from the inlet to the outlet. In certain cases, the screen is in the flow path and in a first portion the chamber between the inlet and the outlet. In various examples, the bleed-in assembly is in a second portion of the chamber downstream from the screen and includes a bleed-in port and a bleed-in door. In some examples, the bleed-in door is selectively movable between an open position and a closed position, where a flow path is defined through the bleed-in port and into the chamber when the bleed-in door is in the open position, and where a flow path through the bleed-in port into the chamber is blocked when the bleed-in door is in the closed position.

According to various examples, a method of filtering a fluid with a separator assembly includes: (a) receiving the fluid in a chamber of the separator assembly along a flow path extending from an inlet to an outlet; (b) filtering solid material from the fluid by directing the fluid through a screen in the chamber; and (c) cleaning the screen with a pulse jet assembly by selectively directing a disrupting fluid on the screen.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
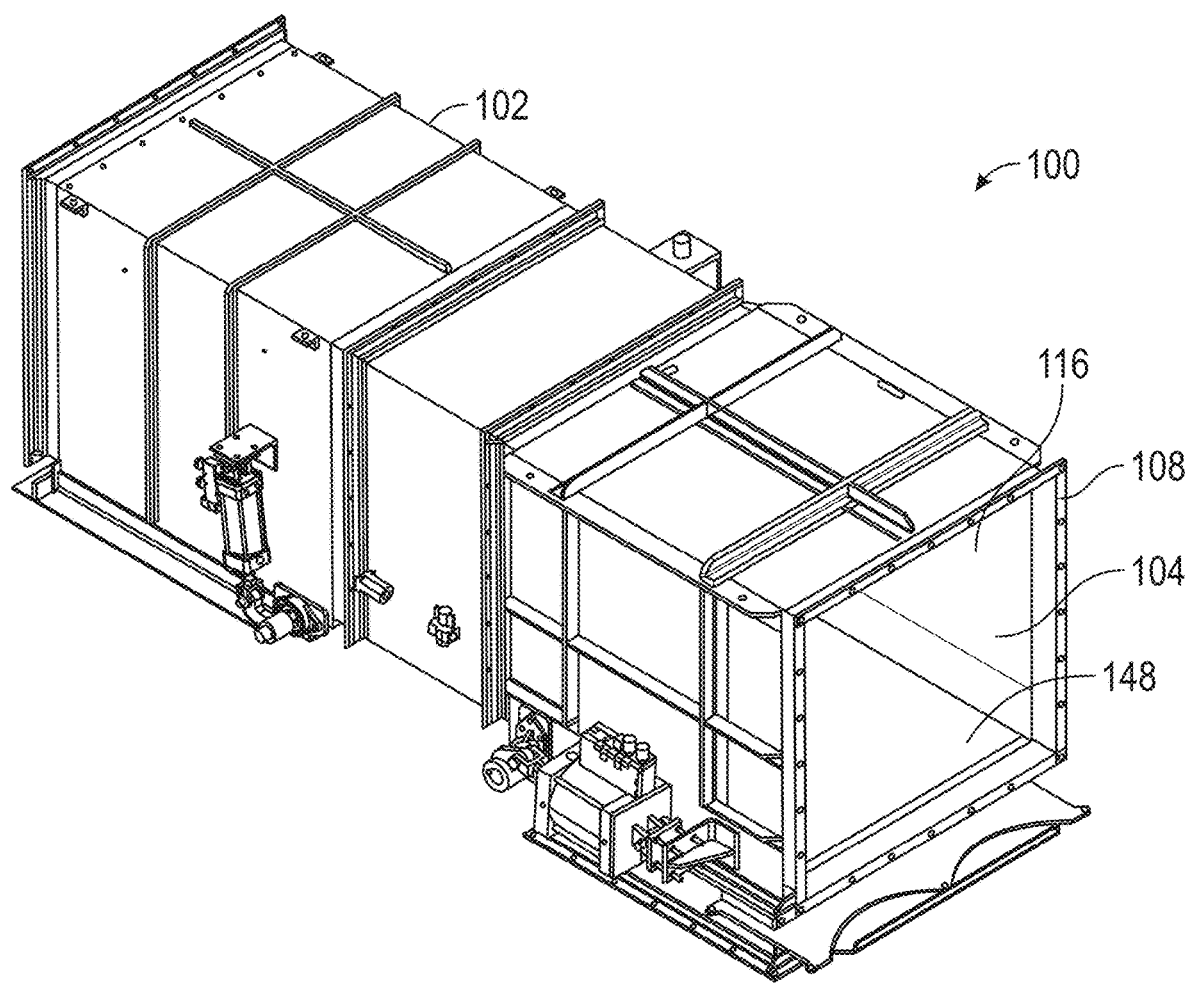
FIG. 1 is a perspective view of a separator assembly according to aspects of the current disclosure.
Figure 2:
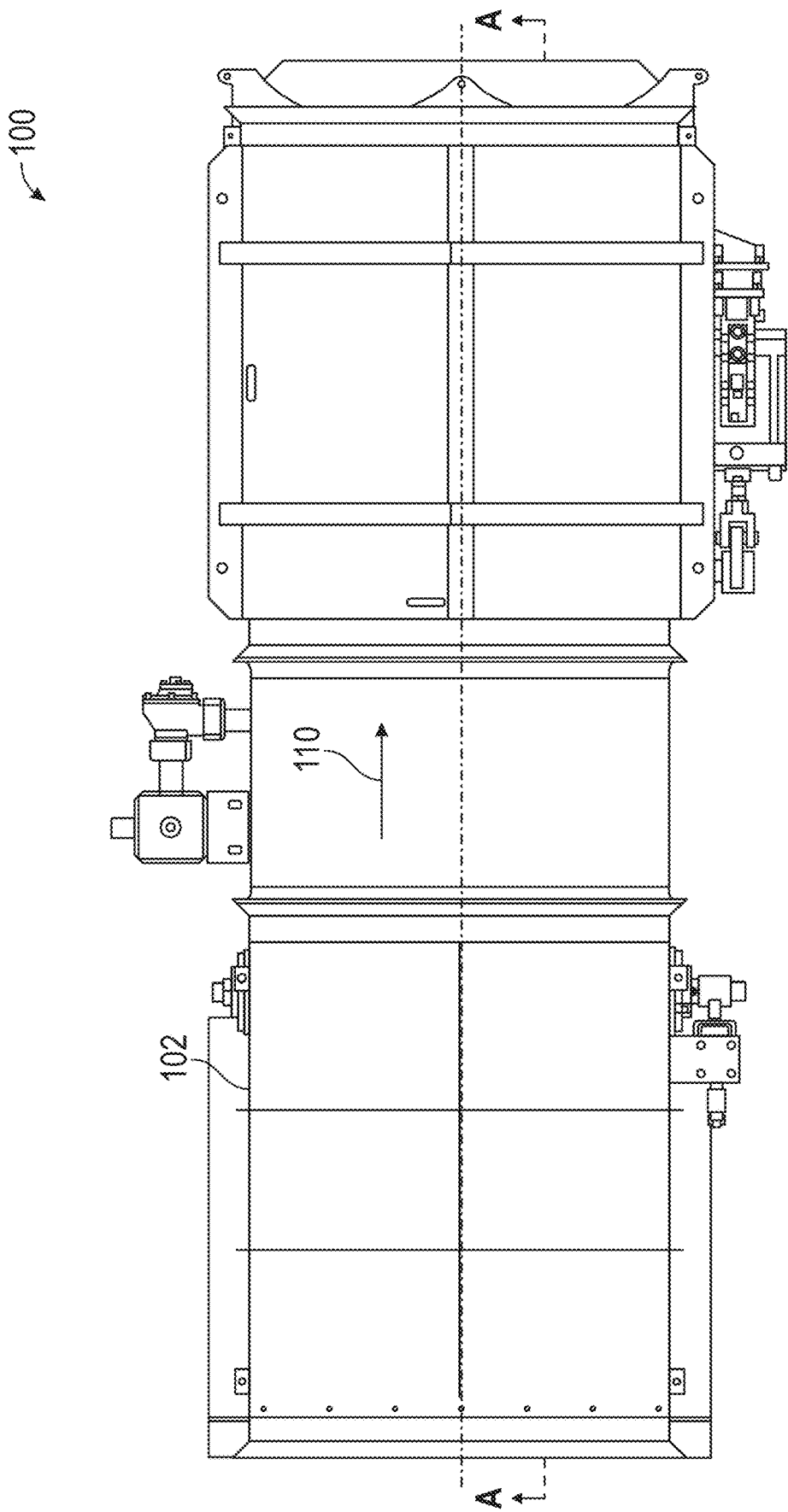
FIG. 2 is a side view of the separator assembly of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

In one aspect, disclosed is a separator assembly for filter systems and associated methods, systems, devices, and various apparatus. The separator assembly includes a housing, a screen, a pulse jet assembly, and a bleed-in assembly. It would be understood by one of skill in the art that the disclosed separator assembly is described in but a few exemplary aspects among many.

The housing of the separator assembly defines a chamber having an inlet and an outlet, and a flow path is defined through the chamber from the inlet to the outlet. The screen is configured to filter solid material from a fluid (e.g., air) flowing through the chamber along the flow path. The pulse jet assembly is configured to selectively clean the solid material from the screen. The bleed-in assembly includes a bleed-in port and is configured to selectively direct a bleed-in fluid through the bleed-in port and into the chamber.

FIGS. 1-4 illustrate an example of a separator assembly 100. The separator assembly 100 includes a housing 102 defining a chamber 104. The chamber 104 has an inlet 106 (see FIG. 3) and an outlet 108, and a flow path is defined through the chamber 104 from the inlet 106 to the outlet 108 in the direction of arrow 110 (see FIG. 2). In various examples, a fluid (e.g., air gas, liquid, etc.) flows along the flow path through the separator assembly. In one non-limiting example, the separator assembly 100 is provided with a dust filter system and is configured to receive air containing dust and/or other solid materials in the chamber 104. The chamber 104 includes a first portion 112 between the inlet 106 and the outlet 108, a second portion 114 downstream from the first portion 112, and a third portion 116 downstream from the second portion 114. In various examples, a diameter 118 of the first portion 112 is greater than a diameter 120 of the second portion 114 and/or greater than a diameter 122 of the third portion 116, although it need not be.

Figure 3:
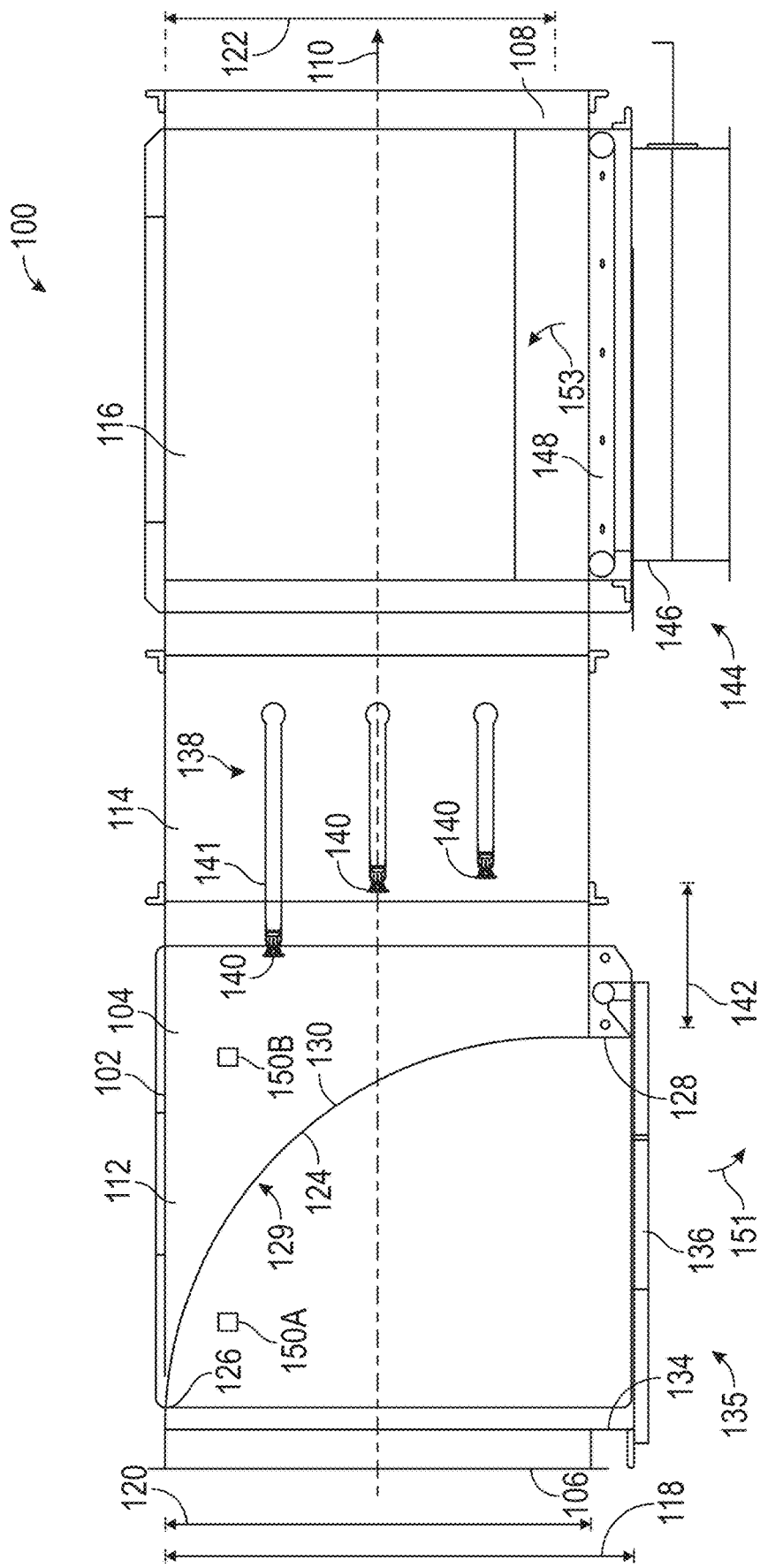
FIG. 3 is a sectional view of the separator assembly of FIG. 1 taken along line A-A in FIG. 2.
Figure 4:
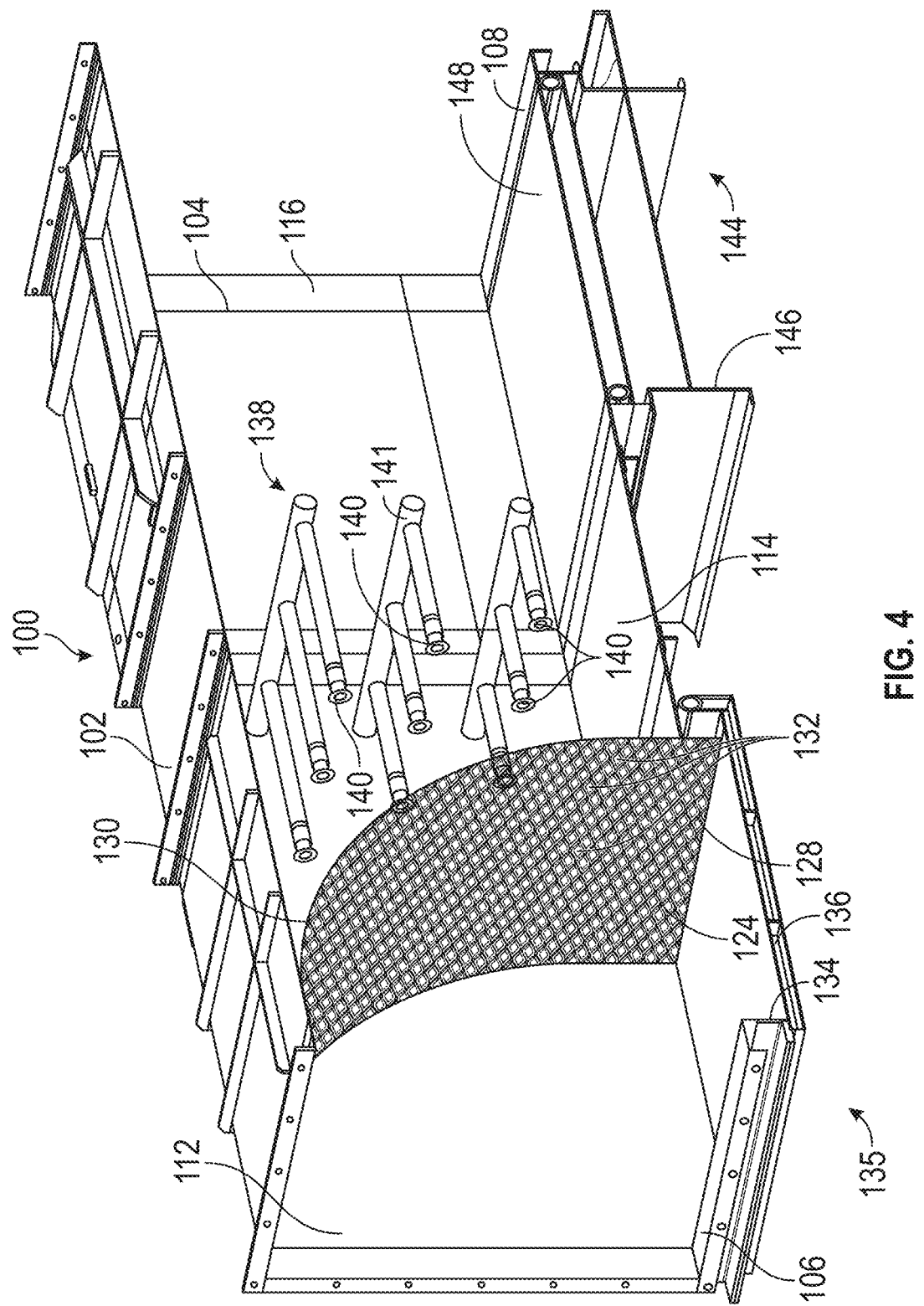
FIG. 4 is a perspective sectional view of the separator assembly of FIG. 1 taken along line A-A in FIG. 2.

As illustrated in FIGS. 3 and 4, the separator assembly 100 includes a screen 124. The screen 124 is positioned within the first portion 112 and in the flow path through the chamber 104 such that the screen 124 filters out solid materials from the fluid as the fluid flows through the screen 124. In certain examples, the screen 124 includes a plurality of perforations 132 (see FIG. 4) that allow for the fluid to flow through the screen 124 while filtering out solid materials from the fluid. In certain non-limiting examples, the perforations are a 0.5 inch hexagonal hole such that at least 80% of the screen is open. In other examples, the perforations 132 may have various other shapes and/or may allow for greater than 80% or less than 80% of the screen to be open.

In some examples, the screen 124 covers or substantially covers a cross-sectional area of the chamber 104 when viewed through the inlet 106 and/or outlet 108. The screen 124 includes a first end 126 and a second end 128. In certain examples, the screen 124 includes a bend 130 between the first end 126 and the second end 128 that is arcuate along the flow path (see FIG. 3). Through the bend 130, the screen 124 provides an arcuate or non-planar surface 129 in the flow path such that an angle at which the fluid impinges the screen 124 changes from the first end 126 to the second end 128. In certain examples, through the bend 130, at least some of the fluid impinges the screen 124 at an acute angle. In various examples, the bend 130 may deflect solid material towards a discharge port 134 of a discharge assembly 135 and thus may reduce the tendency of the solid material to adhere to the screen 124 and possibly build up to such an extent that the screen 124 becomes partially or wholly blocked.

In various examples, the discharge port 134 of the discharge assembly 135 is provided in the first portion 112. In certain aspects when the diameter 118 of the first portion 112 is greater than diameter 120 and/or diameter 122, solid material may accumulate in the discharge port 134 while minimally impacting or influencing the fluid flow through the chamber 104. In some examples, the discharge assembly 135 includes a discharge door 136 associated with the discharge port 134 and movable between an open position and a closed position (see arrow 151 indicating movement from the closed position to the open position). In the closed position (illustrated in FIG. 3), the discharge door 136 may prevent access through the discharge port 134, while in the open position, the discharge door 136 may allow for the material to be discharged through the discharge port 134 and out of the chamber 104. In certain examples, the discharge door 136 is pivotally or hingedly attached to the housing 102. In various other examples, the discharge door 136 may be articulated through various other suitable mechanisms such that the discharge door 136 can be moved between the open position and the closed position.

In certain examples, the separator assembly 100 includes a pulse jet assembly 138 in the second portion 114 of the chamber 104 downstream from the screen 124. In some examples, the pulse jet assembly 138 includes a manifold 141 with at least one nozzle 140, and in various examples, includes a plurality of nozzles 140. In one non-limiting example, the pulse jet assembly 138 includes nine nozzles 140 arranged in three rows of three nozzles 140; however, in various other examples, additional or fewer nozzles 140 may be provided in a similar or different configuration.

The pulse jet assembly 138 is configured to selectively clean the screen 124 and remove solid material caught in the screen 124 by selectively directing a disrupting fluid on the screen 124 through the nozzles 140. In certain examples, the disrupting fluid is compressed air, although various other suitable disrupting fluids may be used. In various examples, the pulse jet assembly 138 pulsates the disrupting fluid against the screen 124. In certain examples, the pulse jet assembly directs the disrupting fluid against the screen 124 for a predetermined time period. In one non-limiting example, the predetermined time period may be from about 2 minutes to about 2.5 minutes, although in other examples, the predetermined time period may be less than 2 minutes (such as 1.5 minutes or less) or greater than 2.5 minutes (such as 3 minutes or greater. In some examples, the nozzles 140 are configured to dispense or pulsate the disrupting fluid simultaneously, although in other examples, various other patterns of dispensing the disrupting fluid may be used (e.g., sequentially, in pairs of nozzles, etc.). Various valves (not shown) may be provided with the pulse jet assembly 138 to control the dispensing of the disrupting fluid through the nozzles 140.

As illustrated in FIG. 3, in some cases, the nozzles 140 are positioned a predetermined distance 142 from the screen 124 such that the integrity of the screen 124 is maintained while the disrupting fluid (e.g., airstream) is directed onto the screen 124. In certain examples, the predetermined distance 142 is directly related to a force (e.g., pressure) at which the disrupting fluid is dispensed from the nozzles 140. As one non-limiting example, the predetermined distance 142 may be about 16 inches when the airstream is dispensed at 40 psi. In certain examples, the airstream may be dispensed at a maximum of about 90 psi. The predetermined distance 142 may or may not be varied from the lower pressure (e.g., the predetermined distance 142 at 90 psi may or may not be varied from the predetermined distance 142 at 40 psi). In some non-limiting examples, the predetermined distance 142 of the disrupting fluid dispensed under a higher pressure may be greater than the predetermined distance 142 of the disrupting fluid dispensed under a lower pressure, although it need not be.

In certain examples, the predetermined distance 142 may be the same for all nozzles 140, although it need not be. In such examples and where the screen 124 includes the bend 130, some nozzles 140 may be positioned upstream relative to other nozzles 140 (i.e., so that the predetermined distance 142 is the same). In other examples, the predetermined distance 142 of some nozzles 140 may be different than the predetermined distance 142 of other nozzles 140.

In various examples, the nozzles 140 are adjustable such that the predetermined distance 142 is adjustable. As one non-limiting example, the nozzles 140 may be adjusted to increase or decrease the predetermined distance 142 depending on whether the disrupting fluid is dispensed at a higher or lower pressure. As another non-limiting example, the nozzles 140 may be adjusted to increase or decrease the intensity of the disrupting fluid on the screen 124 (e.g., a fluid under a pressure dispensed closer to the screen 124 may have a higher intensity than the same fluid and pressure dispensed at a greater distance from the screen 124). Various other combinations of adjusting the pressure, predetermined distance 142, nozzle 140 configuration, and/or various other control factors may be used to control the intensity and pattern of the disrupting fluid on the screen 124.

As illustrated in FIGS. 1-4, in various examples, the separator assembly 100 includes a bleed-in assembly 144 in the third portion 116 and downstream from the screen 124. In some examples, the bleed-in assembly 144 includes a bleed-in port 146 and a bleed-in door 148 associated with the bleed-in port 146. The bleed-in door 148 is selectively movable between an open position and a closed position (see arrow 153 indicating movement from the closed position to the open position). In some examples, in the open position, the bleed-in door is at least partially positioned within the chamber 104 and in the flow path, and fluid (e.g., air, gas, etc.) flow through the bleed-in port 146 into the chamber 104 is enabled. Optionally, the bleed-in door 148 may restrict or prevent fluid flow from the inlet 106 to the outlet 108 in the open position. In certain examples, in the closed position (illustrated in FIG. 3), the bleed-in door 148 blocks the bleed-in port 146 and fluid flow through the bleed in port 146 is restricted and/or prevented. In certain examples, the bleed-in door 148 is pivotally or hingedly attached to the housing 102. In various other examples, the bleed-in door 148 may be articulated through various other suitable mechanisms such that the bleed-in door 148 can be moved between the open position and the closed position In some examples, at least one sensor 150 is provided to detect at least one characteristic of the fluid flowing through the chamber 104. In one non-limiting example, a pressure differential transmitter is provided to detect a pressure differential across the screen 124. In such examples, a first sensor 150A may be positioned upstream of the screen 124 and a second sensor 150B may be positioned downstream of the screen 124. In various other examples, other characteristics may be detected and/or used to control the pulse jet assembly 138 and/or the bleed-in assembly 144. As described below, in certain examples, the pulse jet assembly 138 and/or bleed-in assembly 144 may be activated based on a comparison of the detected characteristic to a predetermined value. In some examples, the predetermined value is indicative of a partial or complete obstruction or blockage of the screen 124.

In various examples, a controller (e.g., a PLC or other suitable controller) is in communication with the sensors 150, pulse jet assembly 138, bleed-in assembly 144, and/or discharge assembly 135.

During use of the separator assembly 100, the separator assembly 100 receives a fluid (such as air) at the inlet 106 and directs the fluid into the chamber 104. In certain examples, the fluid may include various solid materials depending on a particular setting of the separator assembly 100. As one non-limiting example, the separator assembly 100 provided in a paper industry process may receive various tissue papers, toilet paper, paper towels, nonwoven products, or various other solid materials in addition to the fluid.

In the first portion 112 of the separator assembly 100, the fluid impinges the screen 124 such that the solid materials are captured by the screen 124 and the fluid continues flowing through the chamber 104 to the outlet 108. Some of the solid material may be directed to the discharge port 134 of the discharge assembly 135, but some of the solid may stick to the screen 124 (e.g., due to the consistent air flow through the housing 102). In some examples, the controller receives the detected characteristic values from the sensors 150 and compares the detected values to a predetermined value indicative of a partial or completely blocked screen 124. Alternatively, a pressure differential transmitter (or other similar device) may locally monitor the detected values, and may send an alert to the controller when the detected values are at or above the predetermined value indicating that the screen 124 is clogged.

In certain examples, after receiving or determining that the screen 124 is clogged, the bleed-in door 148 may be moved to the open position. The bleed-in door 148 in the open position may allow for air to be diverted from the separator assembly 100 upstream from the separator assembly 100 to eliminate or reduce air flow through the separator assembly 100. In certain examples, the bleed-in door 148 in the open position allows for air from the room and/or surrounding environment to enter the chamber 104 through the bleed-in port 146.

In various examples, once the air flow is diverted, the pulse jet assembly 138 is activated such that compressed air (or other suitable disrupting fluids) are pulsated on to the screen 124 to clear the screen 124 of any solid material. In some examples, the pulse jet assembly 138 may direct the compressed air on to the screen 124 in various other sequences or patterns. In some examples, the pulse jet assembly 138 may direct the compressed air on to the screen 124 for a predetermined time period. In certain non-limiting examples, the predetermined time period may be from about 100 milliseconds to about 1 second. Optionally, after a first predetermined time period (e.g., after 100 milliseconds), the pulse jet assembly 138 is delayed for a delay time period, which may be from about 1 second to about 10 seconds, and then the pulse jet assembly 138 is activated for another predetermined time period. In certain examples, the pulse jet assembly is activated for from about 2 minutes to about 2.5 minutes, although in other examples, it may be less than 2 minutes (such as 1.5 minutes or less) or greater than 2.5 minutes (such as 3 minutes or greater. In certain examples, the pulse jet assembly 138 is deactivated after the predetermined time period.

In various aspects, the solid material cleared from the screen 124 by the pulse jet assembly 138 is accumulated in the discharge port 134. In some examples, the discharge door 136 is moved to the open position such that the solid material may be discharged from the chamber 104 while the pulse jet assembly 138 directs the disrupting fluid on the screen 124 and/or after the pulse jet assembly 138 discontinues dispensing the disrupting fluid on the screen 124. After the solid material is discharged through the discharge port 134, the discharge door 136 and the bleed-in door 148 may both return to their closed position.

The activation and deactivation of the bleed-in assembly 144, pulse jet assembly 138, and/or discharge assembly 135 may be controlled by the controller manually by an operator, or a combination thereof.

A method of using the separator assembly 100 is also provided. Referring to FIG. 3, in certain examples, air is directed through the separator assembly 100 such that the air encounters the screen 124. A pressure detector connected to a controller (such as a PLC) monitors a pressure differential across the screen 124 through at least one sensor 150. In certain examples, as air with pieces of tissue or other debris gets caught in the screen 124, it begins to block the screen area. In various aspects, after the pressure differential as measured by the pressure detector reaches a predetermined value (as one non-limiting example, 7 inches water gauge or less), the bleed-in door 148 is raised into the chamber 104 to restrict or prevent fluid flow to the outlet 108.

After the bleed-in door 148 is raised, the controller sends a signal to the pulse jet assembly 138 such that the disrupting fluid is directed onto the screen 124. In one non-limiting example, directing the disrupting fluid includes controlling a valve on the manifold 141 (e.g., a solenoid valve) such that a first row of the nozzles 140 direct the disrupting fluid for a first predetermined time period (e.g., 100 milliseconds), a second row of nozzles 140 directs the disrupting fluid for a second predetermined time period (e.g., 100 milliseconds) after a delay time period (e.g., 10 seconds) after the first time period, and a third row of nozzles 140 directs the disrupting fluid for a third predetermined time period (e.g., 100 milliseconds) after a delay time period (e.g., 10 seconds) after the second time period. In some non-limiting examples, this pattern is repeated a total of three times. In other examples, other patterns or time periods for directing the disrupting fluid may be provided.

After the pulse jet assembly 138 is deactivated, the discharge door 136 is opened and the tissue paper or other debris falls through the discharge port 134 (and optionally into a bag or other collector unit). In certain examples, the discharge door 136 is opened for a discharge time period. The discharge time period may be from greater than 0 seconds to about 5 seconds, although in other examples, the discharge time period may be greater than 5 seconds. After the discharge time period, the discharge door 136 is closed, and then the bleed-in door 148 is closed to resume filtering with the separator assembly 100.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A separator assembly comprising: a chamber comprising an inlet and an outlet, wherein a flow path is defined through the chamber from the inlet to the outlet; a screen configured to filter solid material from a fluid flowing along the flow path; a pulse jet assembly configured to selectively clean the solid material from the screen; and a bleed-in assembly comprising a bleed-in port and configured to selectively direct a bleed-in fluid through the bleed-in port and into the chamber.

EC 2. The separator assembly of any of the preceding or subsequent example combinations, wherein the flow path is a gas flow path, and wherein the screen is configured to filter solid material from a gas flowing along the gas flow path.

EC 3. The separator assembly of any of the preceding or subsequent example combinations, further comprising: a differential pressure transmitter configured to detect a pressure differential across the screen, wherein the pulse jet assembly is configured to selectively direct compressed on the screen to clean the solid material from the screen when the pressure differential between the air pressure detected by the differential pressure transmitter exceeds a predetermined pressure differential value.

EC 4. The separator assembly of any of the preceding or subsequent example combinations, wherein the pulse jet assembly comprises a plurality of pulse jet nozzles, and wherein each pulse jet nozzle is a predetermined distance downstream from the screen.

EC 5. The separator assembly of any of the preceding or subsequent example combinations, wherein the screen comprises a perforated bend, and wherein at least one of the pulse jet nozzles is upstream relative to another one of the pulse jet nozzles.

EC 6. A separator assembly comprising: a chamber comprising an inlet and an outlet, wherein a flow path is defined through the chamber from the inlet to the outlet; a screen in the flow path and in a first portion the chamber between the inlet and the outlet; and a pulse jet assembly in the flow path, in a second portion of the chamber, and downstream from the screen, wherein the pulse jet assembly is configured to selectively direct a disrupting fluid on the screen.

EC 7. The separator assembly of any of the preceding or subsequent example combinations, further comprising: a first sensor upstream from the screen and configured to detect at least one characteristic of a fluid flowing through the chamber upstream from the screen; and a second sensor downstream from the screen and configured to detect the at least one characteristic of the fluid flowing through the chamber downstream from the screen, wherein the pulse jet assembly is configured to selectively direct the disrupting fluid on the screen when a difference between the at least one characteristic detected by the first sensor and the at least one characteristic detected by the second sensor exceeds a predetermined value.

EC 8. The separator assembly of any of the preceding or subsequent example combinations, wherein the first sensor is a first pressure sensor configured to detect an air pressure upstream from the screen, wherein the second sensor is a second pressure sensor configured to detect the air pressure downstream from the screen, and wherein the pulse jet assembly is configured to selectively direct the disrupting fluid on the screen when a pressure differential between the air pressure detected by the first pressure sensor and the air pressure detected by the second pressure sensor exceeds a predetermined pressure differential value.

EC 9. The separator assembly of any of the preceding or subsequent example combinations, wherein the disrupting fluid is compressed air, and wherein the pulse jet assembly is configured to selectively clean a solid material from the screen by selectively directing the compressed air on the screen.

EC 10. The separator assembly of any of the preceding or subsequent example combinations, wherein the screen is arcuate-shaped along the flow path.

EC 11. The separator assembly of any of the preceding or subsequent example combinations, wherein a diameter of the first portion of the chamber is greater than a diameter of the second portion of the chamber.

EC 12. The separator assembly of any of the preceding or subsequent example combinations, wherein the first portion further comprises: a discharge port; and a discharge door associated with the discharge port and movable between an open position and a closed position, wherein the screen comprises a perforated bend configured to filter a solid material from a fluid flowing along the flow path at an angle and direct the filtered solid material towards the discharge port while allowing the fluid to continue along the flow path.

EC 13. The separator assembly of any of the preceding or subsequent example combinations, wherein the pulse jet assembly is a predetermined distance downstream from the screen.

EC 14. The separator assembly of any of the preceding or subsequent example combinations, wherein the pulse jet assembly comprises a plurality of pulse jet nozzles, and wherein each pulse jet nozzle is the predetermined distance downstream from the screen.

EC 15. The separator assembly of any of the preceding or subsequent example combinations, wherein the screen comprises a perforated bend, and wherein at least one of the pulse jet nozzles is upstream relative to another one of the pulse jet nozzles.

EC 16. The separator assembly of any of the preceding or subsequent example combinations, further comprising: a bleed-in assembly in a third portion of the chamber downstream from the pulse jet assembly, wherein the bleed-in assembly comprises: a bleed-in port; and a bleed-in door, wherein the bleed-in door is selectively movable between an open position and a closed position, wherein a bleed-in flow path is defined through the bleed-in port and into the chamber when the bleed-in door is in the open position, and wherein the bleed-in flow path through the bleed-in port into the chamber is blocked when the bleed-in door is in the closed position.

EC 17. The separator assembly of any of the preceding or subsequent example combinations, wherein the bleed-in door is positioned at least partially within the flow path through the chamber in the open position.

EC 18. The separator assembly of any of the preceding or subsequent example combinations, wherein the bleed-in door blocks the flow path to the outlet and prevents a fluid from flowing from the inlet to the outlet in the open position.

EC 19. A separator assembly comprising: a chamber comprising an inlet and an outlet, wherein a flow path is defined through the chamber from the inlet to the outlet; a screen in the flow path and in a first portion the chamber between the inlet and the outlet; and a bleed-in assembly in a second portion of the chamber downstream from the screen and comprising a bleed-in port and a bleed-in door, wherein the bleed-in door is selectively movable between an open position and a closed position, wherein a flow path is defined through the bleed-in port and into the chamber when the bleed-in door is in the open position, and wherein a flow path through the bleed-in port into the chamber is blocked when the bleed-in door is in the closed position.

EC 20. The separator assembly of any of the preceding or subsequent example combinations, further comprising a pulse jet assembly in the flow path in a third portion of the chamber downstream from the screen and upstream from the bleed-in assembly, wherein the pulse jet assembly is configured to selectively direct a disrupting fluid on the screen.

EC 21. The separator assembly of any of the preceding or subsequent example combinations, further comprising: a first pressure sensor upstream from the screen and configured to detect an air pressure of a fluid flowing through the chamber upstream from the screen; and a second pressure sensor downstream from the screen and configured to detect the air pressure of the fluid flowing through the chamber downstream from the screen, wherein the pulse jet assembly is configured to selectively direct the disrupting fluid on the screen when a pressure differential between the air pressure detected by the first pressure sensor and the air pressure detected by the second pressure sensor exceeds a predetermined pressure differential value.

EC 22. The separator assembly of any of the preceding or subsequent example combinations, wherein the first portion further comprises: a discharge port; and a discharge door associated with the discharge port and movable between an open position and a closed position, wherein the screen comprises a perforated bend configured to filter a solid material from a fluid flowing along the flow path at an angle and direct the filtered solid material towards the discharge port while allowing the fluid to continue along the flow path.

EC 23. A method of filtering a fluid with a separator assembly comprising: receiving the fluid in a chamber of the separator assembly along a flow path extending from an inlet to an outlet; filtering solid material from the fluid by directing the fluid through a screen in the chamber; and cleaning the screen with a pulse jet assembly by selectively directing a disrupting fluid on the screen.

EC 24. The method of any of the preceding or subsequent example combinations, wherein cleaning the screen with the pulse jet assembly comprises: detecting a pressure differential across the screen with a differential pressure transmitter; and activating the pulse jet assembly to direct the disrupting fluid on the screen when the pressure differential between the air pressure detected by the differential pressure transmitter exceeds a predetermined pressure differential value.

EC 25. The method of any of the preceding or subsequent example combinations, wherein activating the pulse jet assembly comprises activating the pulse jet assembly for a predetermined time period.

EC 26. The method of any of the preceding or subsequent example combinations, wherein activating the pulse jet assembly comprises pulsating the disrupting fluid on the screen.

EC 27. The method of any of the preceding or subsequent example combinations, further comprising opening a discharge door and discharging the filtered solid material through a discharge port.

EC 28. The method of any of the preceding or subsequent example combinations, further comprising opening a bleed-in door and blocking the flow path of the fluid with the bleed-in door before cleaning the screen with the pulse jet assembly.

EC 29. The method of any of the preceding or subsequent example combinations, wherein opening the bleed-in door comprises defining a flow path through a bleed-in port into the chamber.

EC 30. The method of any of the preceding or subsequent example combinations, further comprising closing the bleed-in door and unblocking the flow path of the fluid after cleaning the screen with the pulse jet assembly.

EC 31. The method of any of the preceding or subsequent example combinations, further comprising: opening a bleed-in door and blocking the flow path of the fluid with the bleed-in door before cleaning the screen with the pulse jet assembly; opening a discharge door and discharging the filtered solid material through a discharge port after cleaning the screen with the pulse jet assembly; closing the discharge door after the solid material is discharged through the discharge port; and closing the bleed-in door and unblocking the flow path of the fluid after cleaning the screen with the pulse jet assembly.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A separator assembly comprising:
   a chamber comprising an inlet and an outlet, wherein a flow path is defined through the chamber from the inlet to the outlet;
   a screen in the flow path and in a first portion the chamber between the inlet and the outlet, wherein the screen is arcuate-shaped along the flow path such that a surface of the screen in the flow path is non-planar; and
   a pulse jet assembly in the flow path, in a second portion of the chamber, and downstream from the screen, wherein the pulse jet assembly is configured to selectively direct a disrupting fluid on the screen,
   wherein the pulse jet assembly is a predetermined distance downstream from the screen,
   wherein the pulse jet assembly comprises a plurality of pulse jet nozzles and each pulse jet nozzle is the predetermined distance downstream from the screen,
   wherein the screen comprises a perforated bend, and
   wherein at least one of the pulse jet nozzles is upstream relative to another one of the pulse jet nozzles.

2. The separator assembly of claim 1, further comprising:
   a first sensor upstream from the screen and configured to detect at least one characteristic of a fluid flowing through the chamber upstream from the screen; and
   a second sensor downstream from the screen and configured to detect the at least one characteristic of the fluid flowing through the chamber downstream from the screen,
   wherein the pulse jet assembly is configured to selectively direct the disrupting fluid on the screen when a difference between the at least one characteristic detected by the first sensor and the at least one characteristic detected by the second sensor exceeds a predetermined value.

3. The separator assembly of claim 2, wherein the first sensor is a first pressure sensor configured to detect an air pressure upstream from the screen, wherein the second sensor is a second pressure sensor configured to detect the air pressure downstream from the screen, and wherein the pulse jet assembly is configured to selectively direct the disrupting fluid on the screen when a pressure differential between the air pressure detected by the first pressure sensor and the air pressure detected by the second pressure sensor exceeds a predetermined pressure differential value.

4. The separator assembly of claim 1, wherein a diameter of the first portion of the chamber is greater than a diameter of the second portion of the chamber.

5. The separator assembly of claim 1, wherein the first portion further comprises:
   a discharge port; and
   a discharge door associated with the discharge port and movable between an open position and a closed position,
   wherein the a perforated bend is configured to filter a solid material from a fluid flowing along the flow path at an angle and direct the filtered solid material towards the discharge port while allowing the fluid to continue along the flow path.

6. The separator assembly of claim 1, further comprising:
   a bleed-in assembly in a third portion of the chamber downstream from the pulse jet assembly, wherein the bleed-in assembly comprises:
   a bleed-in port; and
   a bleed-in door, wherein the bleed-in door is selectively movable between an open position and a closed position, wherein a bleed-in flow path is defined through the bleed-in port and into the chamber when the bleed-in door is in the open position, and wherein the bleed-in flow path through the bleed-in port into the chamber is blocked when the bleed-in door is in the closed position.

7. The separator assembly of claim 6, wherein the bleed-in door is positioned at least partially within the flow path through the chamber in the open position.

8. The separator assembly of claim 1, wherein the screen comprises a sheet comprising a plurality of perforations.

* * * * *